United States Patent
Casutt

[11] 3,955,744
[45] May 11, 1976

[54] PACK FOR PACKAGING FRAGILE ARTICLES

[76] Inventor: Toni Casutt, Kirchweg 45, 8102 Oberengstringen, Switzerland

[22] Filed: Mar. 6, 1975

[21] Appl. No.: 556,132

[30] Foreign Application Priority Data
Mar. 8, 1974 Switzerland.................. 3268/74

[52] U.S. Cl............................ 229/28 R; 206/521; 229/14 C; 229/29 B; 229/39 B; 229/45 EC; 229/90; 229/DIG. 2
[51] Int. Cl.²......................................... B65D 5/48
[58] Field of Search ............. 229/29 R, 29 B, 29 C, 229/29 D, 28 R, 14 C, 90, 39 B, 2.5 EC, 45 EC, 15, 27, DIG. 2; 206/521

[56] References Cited
UNITED STATES PATENTS

| | | | |
|---|---|---|---|
| 484,627 | 10/1892 | Chapin | 229/90 |
| 1,121,232 | 12/1914 | Davis | 206/521 X |
| 1,126,274 | 1/1915 | Reynolds | 229/15 X |
| 1,217,283 | 2/1917 | Daniel et al. | 229/15 |
| 2,047,790 | 7/1936 | Mascarenhas | 229/28 R |
| 2,868,437 | 1/1959 | Groenhuis | 229/29 R |
| 2,888,134 | 5/1959 | Van Antwerpen | 229/14 C X |
| 3,101,166 | 8/1963 | Van Antwerpen | 229/14 C |
| 3,355,084 | 11/1967 | Donovan | 229/28 R |
| 3,362,609 | 1/1968 | Freedy | 229/14 C |

Primary Examiner—William Price
Assistant Examiner—Stephen P. Garbe
Attorney, Agent, or Firm—Flynn and Frishauf

[57] ABSTRACT

A pack or container for the storage and transportation of fragile articles such as eggs, light bulbs and the like comprises a laminate consisting of a corrugated band or strip and a covering band secured together to give spaced troughs extending transversely of the material, there being spaced, parallel slits in the material extending in the longitudinal direction thereof, the slits extending wholly through the covering band to define separate side-by-side strips thereof and only partially through the corrugated band to define side-by-side strips of such band joined together at the peaks of the corrugations. The junctures form fold lines extending longitudinally of the packing material about which, upon erection of the pack, transversely adjacent regions provide mutually inclined walls defining pockets to receive the articles.

11 Claims, 11 Drawing Figures

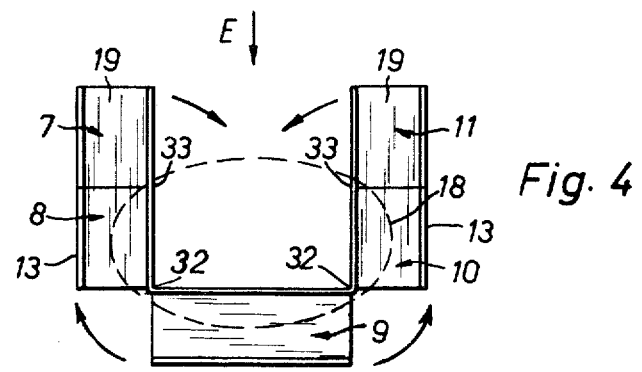
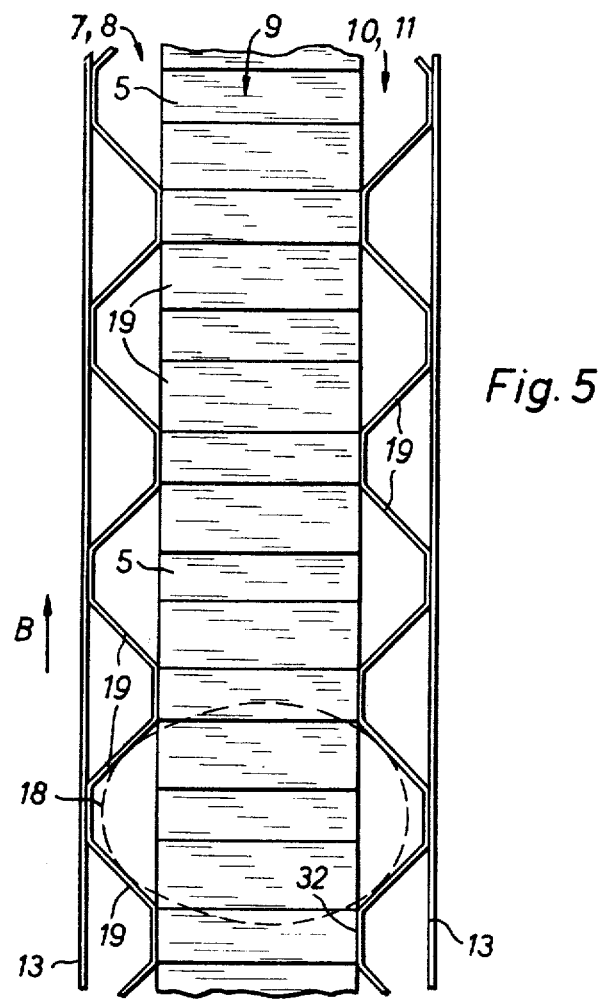

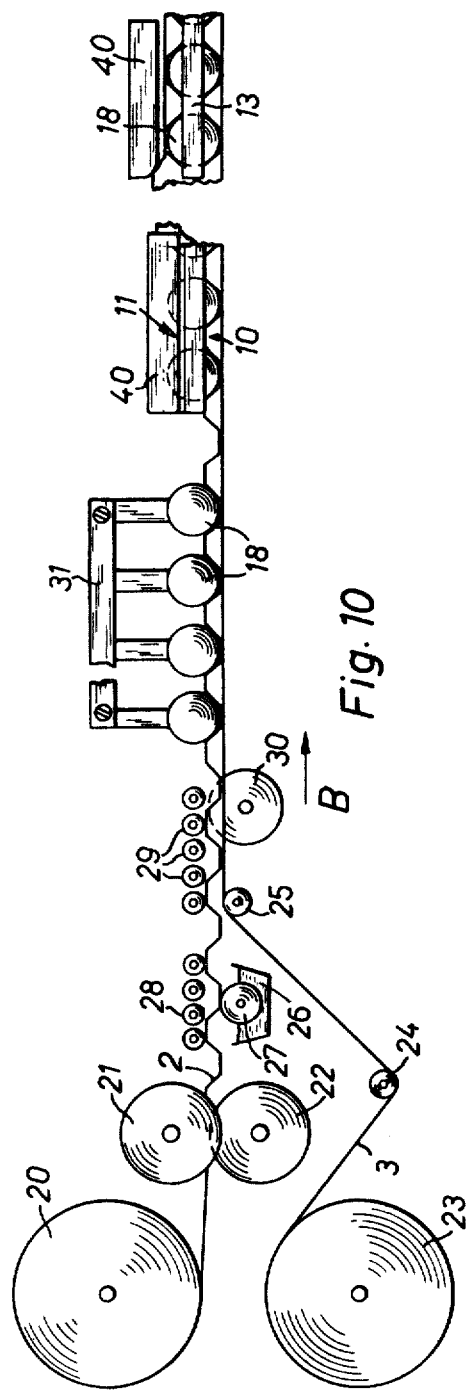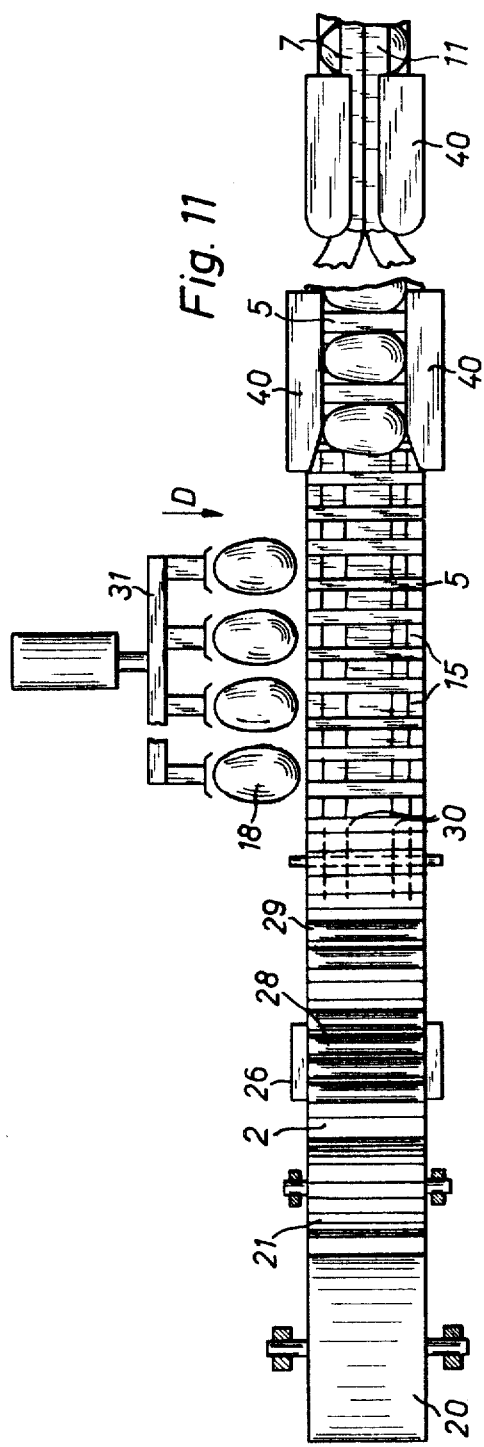

PACK FOR PACKAGING FRAGILE ARTICLES

The invention relates to a pack or container for fragile articles, the pack being particularly adapted to the packaging of eggs, or other fragile articles, but is not restricted to such articles.

Numerous packs or packing cartons for fragile articles, in particular for eggs are known. Disadvantageous with these is the fact that, for the most part, they require complicated machines for their manufacture, they require relatively expensive materials, they take up much space when empty, or they insufficiently protect the articles carried thereby.

It is an object of the invention to provide a pack for fragile articles which is simple to manufacture, requires only inexpensive material, and can be collapsed when empty, while satisfactorily protecting articles packed therein when erected.

Subject matter of the invention: several parallel supporting webs extending in the longitudinal direction of the packing material are provided which each consist of a corrugated band and a strip-like covering band fixed thereto. The covering band is intended to be located on the outside of the erected pack. The supporting webs are connected with one another only on the peaks of the corrugations at fold lines, the supporting webs being adapted to be located about an article to be packed by bending along the said fold lines.

Such a pack has the advantage that it is capable of being manufactured relatively simply and in bulk, with a minimum expenditure of material. The material flexibly supports the packed articles and thereby gives a satisfactory protection against breakage. A further advantageous feature consists in that there is visual control from outside and air has admittance to the packed articles. This is especially important for eggs. The erected pack is capable of being stacked satisfactorily as it is bounded on the outside by plane surfaces.

In accordance with an aspect of the invention, a method for making and loading of the pack is provided forming the subject matter of divisional application Ser. No. 637,083, filed Dec. 2, 1975. A strip-like covering band is connected to a corrugated band after which several parallel longitudinal slits spaced apart from one another are made in the covering band and in the corrugated band, such that these slits completely sever the covering band but terminate below the tops of the corrugations so that several supporting webs running parallel and connecting with one another result, after which the articles to be packed are inserted in the troughs of the corrugations and then the supporting webs are bent along fold lines with the corrugation peaks running in the longitudinal direction of the band parallel to one another and thereby are placed around the articles to be packed.

With this method it is possible to manufacture such packing materials from rolls by simple machines. The fragile articles may then be packed immediately. It is, however, also possible to manufacture the packs at one place and to supply them in the empty flat, collapsed state to a packing station for erection and loading.

The invention will now be described further, by way of example only, with reference to the accompanying drawings, in which:

FIG. 4 is an end elevation of a partially assembled pack;

FIG. 5 is a plan view of the partially erected pack of FIG. 4 as seen in the direction of arrow B;

FIG. 10 shows, in diagrammatic side elevation, a process for manufacturing the packing material and pack of the invention; and FIG. 11 is a diagrammatic plan view corresponding to FIG. 10.

The invention will be described in connection with the packaging of eggs; the packing, however, may serve also for the packaging of other fragile or pressure sensitive articles such as, for example, fruit, glassware or the like.

Figure 1:
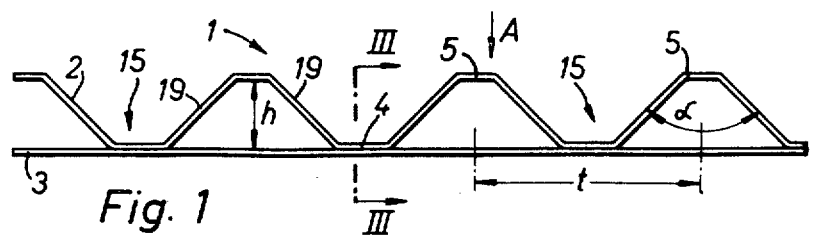
FIG. 1 shows a side elevation of a packing material in flat form.
Figure 2:
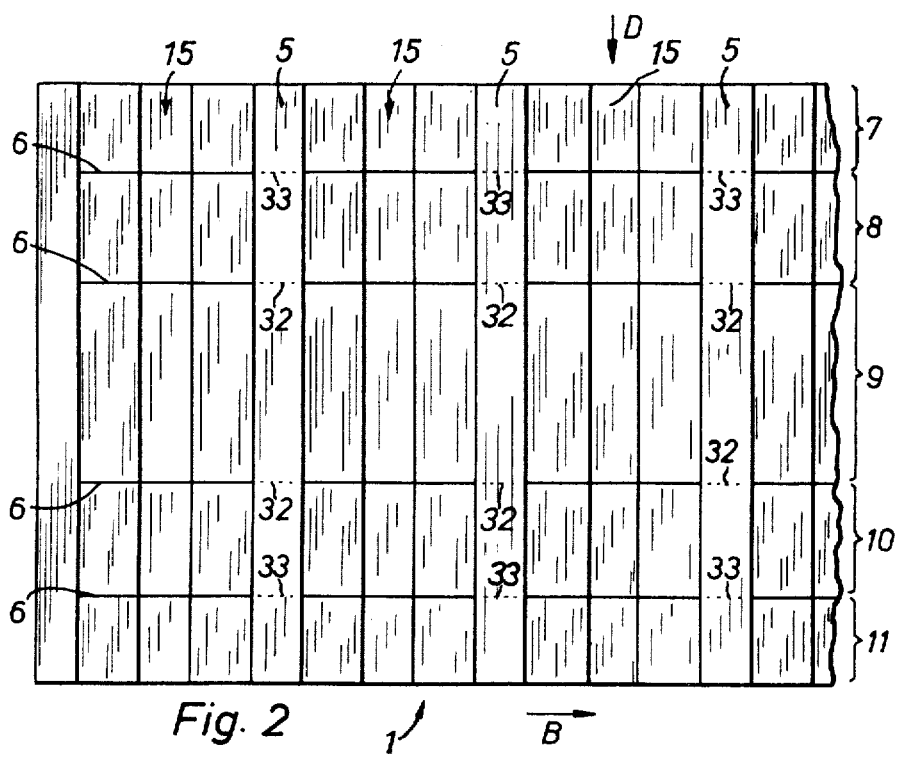
FIG. 2 is a plan view of the packing material as seen in the direction of arrow A of FIG. 1, the packing material being in a flat state.
Figure 3:
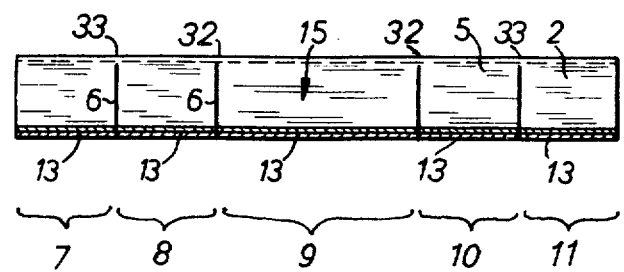
FIG. 3 is a section taken on line III—III of the packing material as shown in FIG. 1.

Referring now to the drawings, and particularly to FIGS. 1 to 3 thereof, pack 1 comprises two strip-like parts, namely a corrugated strip 2 and a flat covering strip 3. Both strips 2 and 3 consist of cardboard of about 0.5mm thickness and such strips may, if desired, be suitably coated with resin, wax or other materials. The corrugated strip 2 is firmly connected to the covering strip 3 at spaced flat areas 4 by means of adhesive. The angle $\alpha$ enclosed by the mutually inclined faces 19 of a corrugation is in the range of about 80° to 110° and preferably is about 90°. The tops 5 of the corrugations are flat. The length $t$ of each corrugation corresponds to the intended patch or spacing at which the articles are to be packed and, in the case of eggs, is between about 4 cm and 5 cm and preferably about 4.5 cm. The length $t$ of the corrugations is 2 to 3 times the height $h$ of the corrugation, and is preferably about 2½ times such height.

A panel (FIG. 2) having the corrugations and flat strip 3 is made. Cuts 6 are formed both in the panel, through the corrugated strip 2 and in the covering strip 3. The cuts are parallel to one another and to the longitudinal direction B of the packing material; they terminate short of the flat tops 5 of the corrugations. In the embodiment shown in FIG. 2 there are, in all, four such cuts 6, thus to give, in effect, five side-by-side supporting webs 7, 8, 9, 10 and 11, each having respective and corresponding corrugations which are connected to one another only at the tops 5 of the corrugations. The middle supporting web 9 is twice as wide as the two outer supporting webs 7 and 11. The width of the middle supporting webs 9 is approximately equal to twice the height $h$ of the corrugation.

Figure 6:
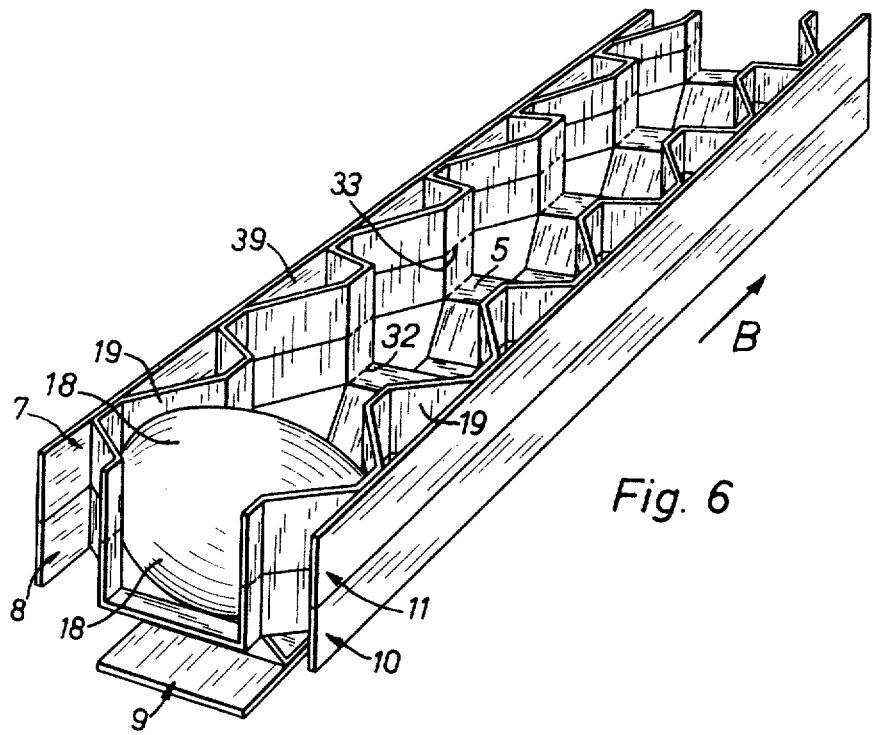
FIG. 6 shows, in perspective view, the partially erected pack of FIGS. 4 and 5.

Use and loading: The panel is laid flat on a support. The articles to be packaged, for example, six eggs arranged side-by-side, are pushed into respective troughs of the corrugations 15 in the direction of the arrow D (FIG. 2) until they lie approximately in the middle of the corrugated web 9. The supporting webs 7 and 8 on one side and the supporting webs 10 and 11 on the other side, are then erected by folding the webs through 90° about fold lines 32 defined on the tops of the corrugations 5 and aligned with cut 6 so that the approximately U-shaped intermediate position shown in FIGS. 4 to 6 results. Thus, the eggs 18 are surrounded on three sides by the supporting webs 8, 9, 10. In a further step, the two outermost supporting webs 7 and 11 are each folded inwards through 90° about respective fold lines 33 to result in the pack according to FIG. 7. The structure is maintained in its erected folded state with the eggs positioned therein by means of adhesive strips 12 applied to the abutting supporting webs 7 and 11. The eggs 18 are now surrounded on all four sides by the supporting webs 7 to 11, but the nature of the pack is such that surrounding air has access to the eggs; this is important for storage and to keep them fresh. In addition, it can readily be ascertained from outside whether, for example, an egg is broken. As is readily appreciated the erected pack is of generally rectangular form. As the inclined parts 19 of the corrugations 15 are somewhat resilient, and as the packed articles generally are supported by such inclined parts 19 rather than against the bottom, or flats of the trough between corrugation 19, the articles are cushioned against impacts. Furthermore, the resilience of the inclined parts provides for the ready acceptance of articles of a variety of sizes. The deformation of the inclined parts 19 may vary according to size of the article concerned, so as to accommodate the same. In addition, the erected pack can take a reasonable amount of pressure, especially in stacking.

Figure 8:
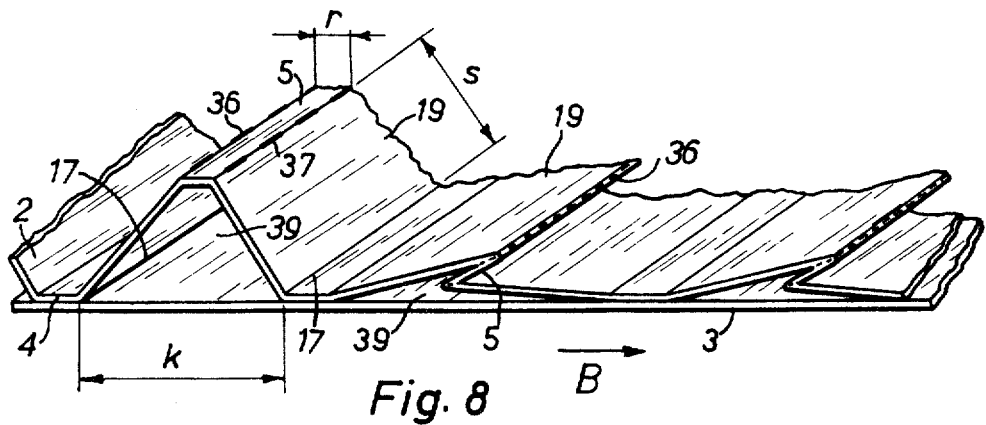
FIG. 8 is a diagrammatic perspective view of an alternative embodiment having corrugations capable of being flattened.

In FIG. 8 an embodiment is shown in which the corrugations are collapsible to provide for flat storage of the pack and for the transportation thereof in minimum space. To provide for the ready collapse of the corrugations, the tops 5 of such corrugations are formed with lines of weakness 36, 37, preferable performations, extending transversely of the packing. The lines of weakness 36, 37 facilitate the folding and collapsing of the corrugations, so that finally there remains only a minimum thickness which corresponds to 3 times the thickness of the cardboard of the corrugation band 2 together with a single thickness of the covering band 3. The erection of the folded corrugations is effected by simultaneous insertion of mechanical fingers into the hollow spaces 39.

For fully collapsing the corrugations the following relations are to maintain: twice the length $s$ of the inclined part 19 of the corrugation minus the width 4 of the tops 5 has to correspond to the distance $k$ of the bending lines 17 at the basis of the corrugations.

Figure 9:
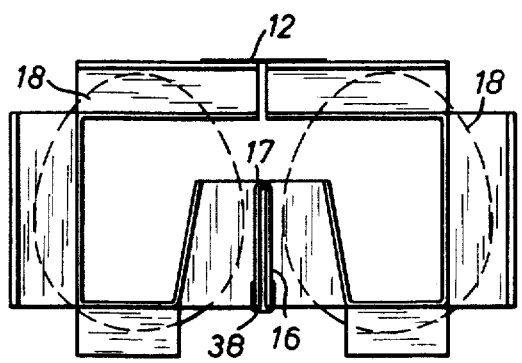
FIG. 9 is an end elevation of a still further embodiment comprising a packing material for forming a double-row pack.

FIG. 9 illustrates an embodiment for forming a double row pack, the middle strip being bent along a fold line 17. The remaining construction of this packing material and the resultant pack corresponds in principle to that as explained in connection with FIGS. 1 and 8, it being understood, however, that in the case of the embodiment of FIG. 9 the eggs preferably take up an upright position, whereas in FIGS. 1 and 8 they are lying horizontally.

The method of manufacture of such packing materials as aforesaid and of the erection of the same into a resultant pack is illustrated in FIGS. 10 and 11. Thus, referring to FIGS. 10 and 11, material for the corrugated band 2 is drawn off from a roll 20 and is guided between two shaping wheels 21, 22, such wheels 21, 22 having cooperating toothlike raised portions and recesses for forming a band guided therethrough to a corrugated shape. The material for the covering strip is provided as a roll 23 disposed beneath the roll 20 and is drawn from such roll over guide rollers 24, 25. Before the two bands are brought together, the corrugated band 2 is guided into contact with a glue applicator roller 27 partially immersed in a glue container 26 whereby adhesive is applied to the underside of the troughs of the corrugations. A plurality of pressure rollers 28 is provided above the corrugated band for ensuring contact of the band with the applicator roller 27, whilst a further plurality of pressure rollers 29 is provided for urging the corrugated band into contact with the covering band. The laminate is then guided past four circular knives 30, which form the longitudinal slits in the corrugated band and in the covering band to define the five parallel supporting bands 7 to 11 the knives being so positioned and dimensioned in relation to the corrugations as not to separate the tops 5 of the corrugations.

Eggs 18 or other articles to be packaged are pushed either simultaneously or in succession, onto the flattened packing material from the side, arrow D, into the troughs of the corrugations 15. A pusher 31 having fingers for engagement with the eggs is provided for this purpose. The supporting webs 8 and 10 are then to be folded from the plane of the middle supporting web 9 and 90° about the fold lines 32 to give the arrangement shown in FIG. 6. For this, there are present stationary guide shoes 40 or the like which effect lateral erecting of the supporting bands. In a subsequent operation, the support webs 7 and 11 are bent through 90° from the planes of bands 8 and 10 respectively about fold lines 33 to give the final shape shown in FIG. 7. Adhesive strips 12 are then placed over the abutting joints of the two longitudinal strips 13 and the packing is cut to the desired length. The whole manufacturing process may be effected step-by-step or continuously.

The material of the rolls 20, 23 may be previously printed or printing may be effected during the working procedure described.

The manufacture of the material for the double row pack of FIG. 9 is effected in a similar manner, the differences being that the width of the material is greater than with the packing according to FIGS. 1 to 7 and there is, additionally, a fold line 17 whereas the material strip 16 is so bent as to give two parts arranged in adjacent back-to-back disposition. On the underside there are additionally applied adhesive strips 38 in order to secure this packing in the position shown in FIG. 9. The two strip-like parts 16 which lie in back-to-back disposition may be glued together, if desired.

Figure 7:
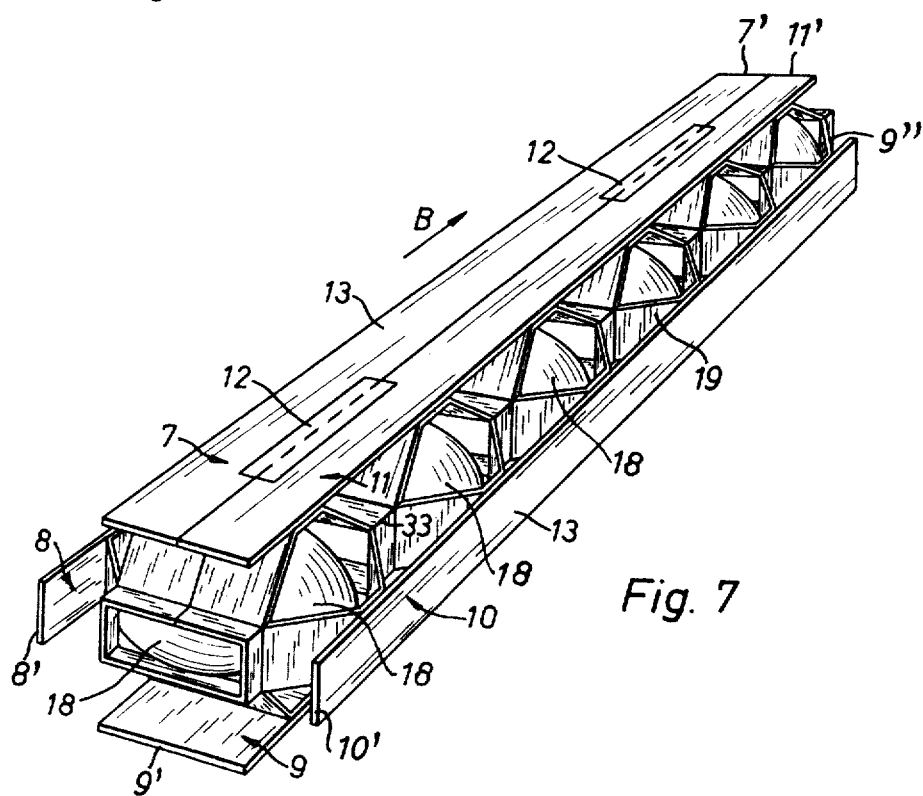
FIG. 7 is a perspective view of the finished pack as used for the packaging of eggs.

The end portions of the supporting webs 7–11 can be extended as shown in FIG. 7 at 7' to 11', the extended end portions then being folded towards each other to square off the pack and provide additional stiffness and strength for stacking. One of these folded end portions is seen at 9" in FIG. 7.

Various changes and modifications may be made within the scope of the inventive concept.

I claim:

1. A pack for fragile articles, in particular eggs, comprising a plurality of parallel supporting webs extending in the longitudinal direction of the packing material each comprising a corrugated strip (2), the corrugations of the strip having top portions formed with fold lines (32, 33);

and a strip-like covering band (3) fixed thereto, which covering band (3) is located on the outside of the pack when in use, said covering band being secured to its corresponding corrugated strip opposite the top portions, thereof the supporting webs (7–11) being connected with one another only on the top portions of the corrugations (5) at the fold lines (32, 33) whereby the supporting webs (7–11) can be placed around the articles (18) to be packed by bending along the said fold lines (32, 33).

2. A pack according to claim 1, wherein the material of the webs is cardboard.

3. A pack according to claim 1, wherein five supporting webs (7–11) are provided, the middle web (9) thereof being twice as wide as the two outermost webs (7, 11).

4. A pack according to claim 1, wherein, when the pack is folded, the covering bands (13) define a rectangle.

5. A pack according to claim 1, wherein the length ($t$) of the corrugations determines the pitch distance or spacing of the articles (18) to be packed.

6. A pack according to claim 5, wherein the length ($t$) of the corrugations is from two to three times, preferably about two and a half times, the height ($h$) of the corrugations and wherein the angle ($\alpha$) enclosed by the inclined faces of the corrugations (19) is between 80° and 110°, preferably about 90°.

7. A pack according to claim 1, wherein the middle web (9) has a longitudinally extending fold line for forming a double row pack to permit folding the material at the two sides of the said fold line to be in adjacent back-to-back disposition upon erection to form the pack.

8. A pack according to claim 1, wherein the tops (5) of the corrugations are provided with two lines of weakness (36, 37) arranged parallel to one another and extending transversely to the longitudinal direction of the pack.

9. A pack according to claim 8, wherein twice the length ($s$) of the inclined part of the corrugation minus the width ($r$) of the tops (5) thereof corresponds to the distance ($k$) between the bending lines (17) at the base of the corrugations.

10. An erected pack structure, erected from a pack as claimed in claim 1, wherein adjacent webs are disposed at right angles to each other, the end webs (7, 11) abutting each other; and an adhesive cover strip (12) covering both the abutting end webs and securing said end webs in the abutting position.

11. A pack structure as claimed in claim 10, having an article or articles supported therein.

* * * * *